US009147366B2

(12) United States Patent  
Cho et al.

(10) Patent No.: US 9,147,366 B2  
(45) Date of Patent: Sep. 29, 2015

(54) METHOD FOR DRIVING A LIQUID CRYSTAL DISPLAY DEVICE, AN ARRAY SUBSTRATE, METHOD OF MANUFACTURING THE ARRAY SUBSTRATE AND LIQUID CRYSTAL DISPLAY DEVICE HAVING THE SAME

(75) Inventors: Yong-Seok Cho, Seoul (KR); Jae-Hyun Kim, Suwon-si (KR); Gee-Bum Kim, Incheon (KR); Jae-Hoon Hwang, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 757 days.

(21) Appl. No.: 12/485,721

(22) Filed: Jun. 16, 2009

(65) Prior Publication Data  
US 2009/0315880 A1 Dec. 24, 2009

(30) Foreign Application Priority Data  
Jun. 24, 2008 (KR) .................. 2008-59430

(51) Int. Cl.  
G02F 1/1362 (2006.01)  
G02F 1/1368 (2006.01)  
G02F 1/1335 (2006.01)  
G09G 3/36 (2006.01)

(52) U.S. Cl.  
CPC .......... *G09G 3/3648* (2013.01); *G02F 1/13624* (2013.01); *G02F 1/1368* (2013.01); *G02F 1/133555* (2013.01); *G09G 2300/0426* (2013.01); *G09G 2300/0439* (2013.01); *G09G 2300/0456* (2013.01); *G09G 2300/0465* (2013.01); *G09G 2300/0852* (2013.01); *G09G 2320/0233* (2013.01)

(58) Field of Classification Search  
CPC .. G09G 2300/0456; G09G 5/36; G02F 1/133; G02F 1/1343  
See application file for complete search history.

(56) References Cited

U.S. PATENT DOCUMENTS

| 4,093,356 A | * | 6/1978 | Bigelow | 349/114 |
| 2005/0012879 A1 | * | 1/2005 | Lin | 349/114 |
| 2005/0134773 A1 | * | 6/2005 | Park et al. | 349/117 |
| 2005/0270433 A1 | * | 12/2005 | Ohue et al. | 349/38 |

(Continued)

FOREIGN PATENT DOCUMENTS

| JP | 2000-035570 | 2/2000 |
| JP | 2003-084298 | 3/2003 |
| JP | 2007-065647 | 3/2007 |

(Continued)

*Primary Examiner* — Andrew Sasinowski  
*Assistant Examiner* — Mihir Rayan  
(74) *Attorney, Agent, or Firm* — Innovation Counsel LLP

(57) ABSTRACT

In a method for driving a liquid crystal display (LCD) device, an array substrate, a method of manufacturing the array substrate and the LCD device having the same, data signals are boosted by a first and a second boost signals up to a first and a second pixel voltages, respectively. The first and the second pixel voltages are applied to a transmissive electrode and a reflective electrode, respectively. As a result, the retardation of light passing through a liquid crystal layer on the transmissive electrode and the retardation of light of the liquid crystal layer on the reflective electrode may be controlled to be substantially equal to each other. Thus, the LCD device is driven in a transflective mode with a mono-cell gap so that the yield of the LCD device may be increased.

15 Claims, 17 Drawing Sheets

(56) References Cited

U.S. PATENT DOCUMENTS

| | | | |
|---|---|---|---|
| 2008/0117156 A1* | 5/2008 | Chen et al. | 345/92 |
| 2008/0123000 A1* | 5/2008 | Lin et al. | 349/33 |
| 2008/0252803 A1* | 10/2008 | Mori et al. | 349/38 |
| 2010/0053488 A1* | 3/2010 | Kim et al. | 349/48 |

FOREIGN PATENT DOCUMENTS

| | | |
|---|---|---|
| JP | 2007-241282 | 9/2007 |
| KR | 10-2005-0060847 | 6/2005 |
| WO | 2006/007610 A1 | 1/2006 |
| WO | 2008/007610 | 1/2008 |

* cited by examiner

METHOD FOR DRIVING A LIQUID CRYSTAL DISPLAY DEVICE, AN ARRAY SUBSTRATE, METHOD OF MANUFACTURING THE ARRAY SUBSTRATE AND LIQUID CRYSTAL DISPLAY DEVICE HAVING THE SAME

PRIORITY STATEMENT

This application claims priority under 35 U.S.C. §119 to Korean Patent Application No. 2008-59430, filed on Jun. 24, 2008 in the Korean Intellectual Property Office (KIPO), the contents of which are herein incorporated by reference in their entirety.

BACKGROUND OF THE INVENTION

1. Field of the Invention

Example embodiments of the present invention relate to a method for driving a liquid crystal display (LCD) device, an array substrate, a method of manufacturing the array substrate, and an LCD device having the same. More particularly, example embodiments of the present invention relate to a method for driving an LCD device in a transflective mode with a mono-cell gap, an array substrate, a method of manufacturing the array substrate and an LCD device having the same.

2. Description of the Related Art

Generally, a liquid crystal display (LCD) device displays an image by controlling the transmittance of liquid crystal using an electric field. LCD devices may be classified into transmissive-type, reflective-type and transflective-type LCD devices. In a transmissive-type LCD device, a backlight device provides light to the LCD device. In a reflective-type LCD device, the LCD device displays an image using natural light. A transflective LCD device is formed by combination of the transmissive-type and the reflective-type LCD devices.

In the transflective-type LCD device, a transmissive electrode and a reflective electrode are separately formed on one pixel area and a pixel voltage is applied to the transmissive electrode and the reflective electrode through one TFT. An electric field that is generated by the pixel voltage and common voltage of a common electrode is applied to a liquid crystal (LC) layer and liquid crystal is realigned.

A liquid crystal cell on a transmissive area alters the phase of incident light by a ½λ retardation. However, incident light into the reflective electrode passes through the liquid crystal layer two times before and after reflection from the reflective electrode in a reflective area. Thus, a multi-cell gap mode is used in the LCD device. In a multi-cell gap LCD device, a cell gap on the reflective area is half of a cell gap on the transmissive area so that the transmitting lengths of total light are substantially equal to each other. As a result, phases of light emitted from the transmissive area and the reflective area are substantially equal to each other. Thus, steps are formed on a TFT substrate or a color filter substrate so that the cell gap in the reflective area is smaller than the cell gap in the transmissive area.

The multi-cell gap LCD device is suitable for the transflective mode. However, the multi-cell gap LCD device may include many defects from a manufacturing process. For example, alignment layer deposition defects caused by the steps of the reflective area, alignment defects such as polyimide agglomeration, and texture defects may occur. In particular, bruising may occur, and contrast ratio may be decreased in the transflective mode.

SUMMARY OF THE INVENTION

Example embodiments of the present invention provide a method for driving a liquid crystal display (LCD) device for preventing contrast ratio reduction and texture defects.

Example embodiments of the present invention also provide an array substrate for preventing contrast ratio reduction and texture defects.

Example embodiments of the present invention also provide a method of manufacturing the array substrate.

Example embodiments of the present invention also provide an LCD device having the array substrate.

According to one aspect of the present invention, there is provided a method for driving an LCD device. In the method, data signals are outputted according to image signals. The data signals are boosted according to a first boost signal up to a first pixel voltage that is applied to a transmissive electrode to control first light passing through a liquid crystal layer on the transmissive electrode. The data signals are boosted according to a second boost signal up to a second pixel voltage that is applied to a reflective electrode to control the retardation of second light to be substantially equal to the retardation of the first light. The second light is incident into the liquid crystal layer on the reflective electrode and reflected from the reflective electrode.

In an example embodiment of the present invention, cell gaps of the liquid crystal layer on the transmissive electrode and the reflective electrode may be substantially equal to each other. Voltage levels of the first and the second pixel voltages are controlled so that the retardation of the second light before and after reflection from the reflective electrode is substantially equal to the retardation of the first light passing through the liquid crystal layer.

According to another aspect of the present invention, an array substrate includes a first switching element, a second switching element, a gate line, a data line, a first boost line, a second boost line, a transmissive electrode, and a reflective electrode formed on a pixel area of a substrate. The first and the second switching elements include a gate electrode, a source electrode, and a drain electrode facing with each other on the gate electrode, respectively. The gate line is electrically connected with the gate electrodes of the first and the second switching elements. The data line is electrically connected with the sourced electrodes of the first and the second switching elements and the data line is insulated from the gate line. The first boost line forms a first storage capacitor together with the drain electrode of the first switching element. The second boost line forms a second storage capacitor together with the drain electrode of the second switching element. The transmissive electrode is disposed on a first area of a pixel area and electrically connected with the drain electrode of the first switching element. The reflective electrode is disposed on a second area of a pixel area and electrically connected with the drain electrode of the second switching element.

In an example embodiment of the present invention, thickness between the substrate and the transmissive electrode may be substantially equal to a thickness between the substrate and the reflective electrode. The first and the second boost lines may be formed both sides of the gate line on the substrate and substantially parallel to the gate line. The gate line may extend between the first and the second switching elements.

According to further another aspect of the present invention, there is provided a method of manufacturing an array substrate. In the method, a first boost line, a second boost line, a gate line, and a gate electrode between the first and the second boost lines are formed on a pixel area of a substrate. A first insulation layer is formed on the gate electrode and a conductive layer is formed on the first insulation layer. A data line is formed to cross the gate line on the first insulation layer. A first source electrode and a second source electrode are formed to extend from the data line above the conductive layer. A first drain electrode and a second drain electrode are formed to face the first and the second source electrodes, respectively. A second insulation layer is formed on the data line. A first contact hole and a second contact hole are formed on the second insulation layer to partially expose the first and the second drain electrodes. A transmissive electrode is formed on the second insulation layer corresponding to a first area of the pixel area. The transmissive electrode is electrically connected with the first drain electrode through the first contact hole. A reflective electrode is formed on the second insulation layer corresponding to a second area of the pixel area. The reflective electrode is electrically connected with the second drain electrode through the second contact hole.

In an example embodiment of the present invention, cell gaps of the liquid crystal layer on the transmissive electrode and the reflective electrode may be substantially equal to each other. A first storage electrode and a second storage electrode may be further formed and the first and the second storage electrodes may be connected with the first and the second boost lines and face the first and the second drain electrodes, respectively. The first and the second boost lines, the gate line, the first and the second source electrodes, and the second drain electrode may be formed under the reflective electrode.

According to further still another aspect of the present invention, an LCD device includes an array substrate, a counter substrate, and a liquid crystal layer. The array substrate includes a first switching element, a second switching element, a gate line, a data line, a first boost line, a second boost line, a transmissive electrode, and a reflective electrode formed on a pixel area of a substrate. The gate line is electrically connected with gate electrodes of the first and the second switching elements. The data line is electrically connected with the source electrodes of the first and the second switching elements. The first boost line forms a first storage capacitor together with a drain electrode of the first switching element. The second boost line forms a second storage capacitor together with the drain electrode of the second switching element. The transmissive electrode is electrically connected with the drain electrode of the first switching element on a first area of the pixel area. A reflective electrode is electrically connected with the drain electrode of the second switching element on a second area of the pixel area. The counter substrate faces the array substrate. A liquid crystal layer is disposed between the counter substrate and the array substrate. Cell gaps on the transmissive electrode and the reflective electrode are substantially equal to each other.

In an example embodiment of the present invention, the first and the second boost lines may be formed on both sides of the gate line on the substrate and substantially parallel to the gate line. The gate line may extend between the first and the second switching elements. The first and the second boost lines, the gate line, the first and the second source electrodes, and the second drain electrode may be formed under the reflective electrode for increasing transmittance of the transmissive electrode.

According to some example embodiments of the present invention, an LCD device is driven on a transflective mode with a mono-cell gap. Thus, the number of steps of a manufacturing process may be decreased, and contrast ratio may be increased. Also, textures and alignment defects caused by multi-cell gaps may be prevented. As a result, display quality may be improved and the yield of the LCD device may be increased. Thus, the present invention may be applied to the LCD device driven in a transflective mode with a mono-cell gap.

BRIEF DESCRIPTION OF THE DRAWINGS

The above and other features and advantages of the present invention will become more apparent by describing in detailed example embodiments thereof with reference to the accompanying drawings.

DETAILED DESCRIPTION OF THE INVENTION

Figure 1:
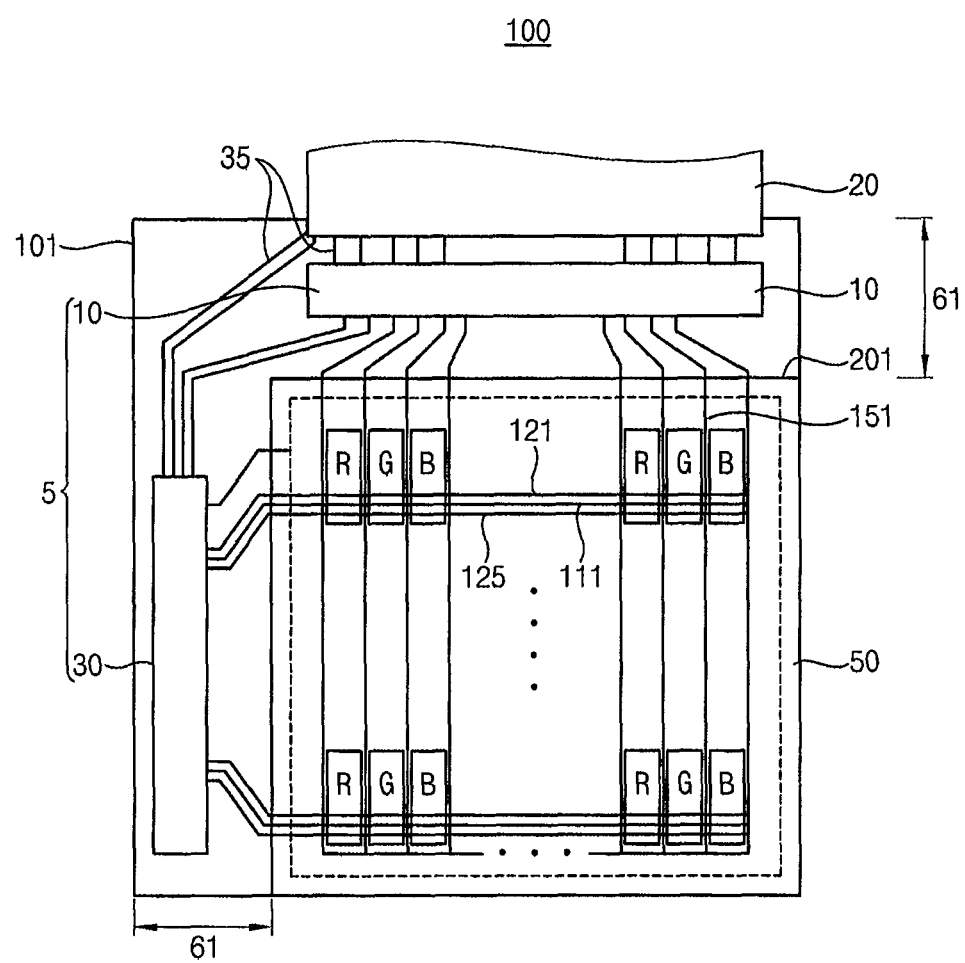
FIG. 1 is a plan view illustrating a liquid crystal display (LCD) device in accordance with an example embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a plan view illustrating a liquid crystal display (LCD) device 100 in accordance with an example embodiment of the present invention.

Referring to FIG. 1, an LCD device 100 in an example embodiment includes an array substrate 101, a counter substrate 201 and a liquid crystal layer.

The array substrate 101 and the counter substrate 201 facing with each other are combined by a sealing member 50 having a frame shape. The liquid crystal layer is formed within an internal space formed by the array substrate 101, the counter substrate 201 and the sealing member 50.

The array substrate 101 may be elements substrate which is driven by active matrix type using a thin film transistor. The counter substrate 201 may be a color filter substrate which includes R, G and B color filters.

Figure 2:
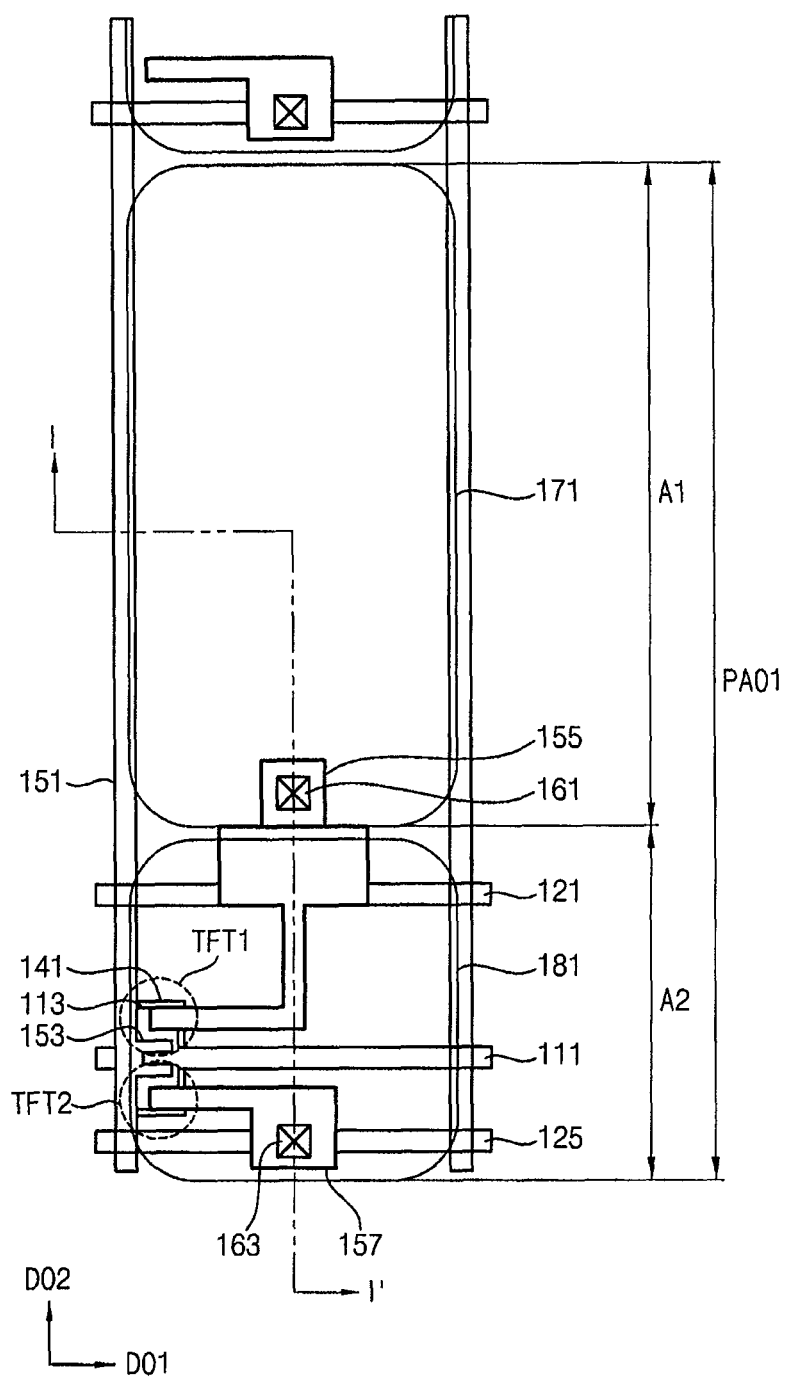
FIG. 2 is an enlarged plan view illustrating a example of a unit pixel area in FIG. 1.

FIG. 2 is an enlarged plan view illustrating an example of a unit pixel area PA01 in FIG. 1.

Referring to FIG. 2, a transmissive electrode 171 and a reflective electrode 181 are together formed on a pixel area PA01. Thus, the LCD device 100 is a transflective LCD device.

The cell gaps of the liquid crystal layer on the transmissive electrode 171 and the reflective electrode 181 are formed substantially equal to each other. The cell gap is referred to as the thickness the liquid crystal layer between the array substrate 101 and the counter substrate 201.

Figure 3:
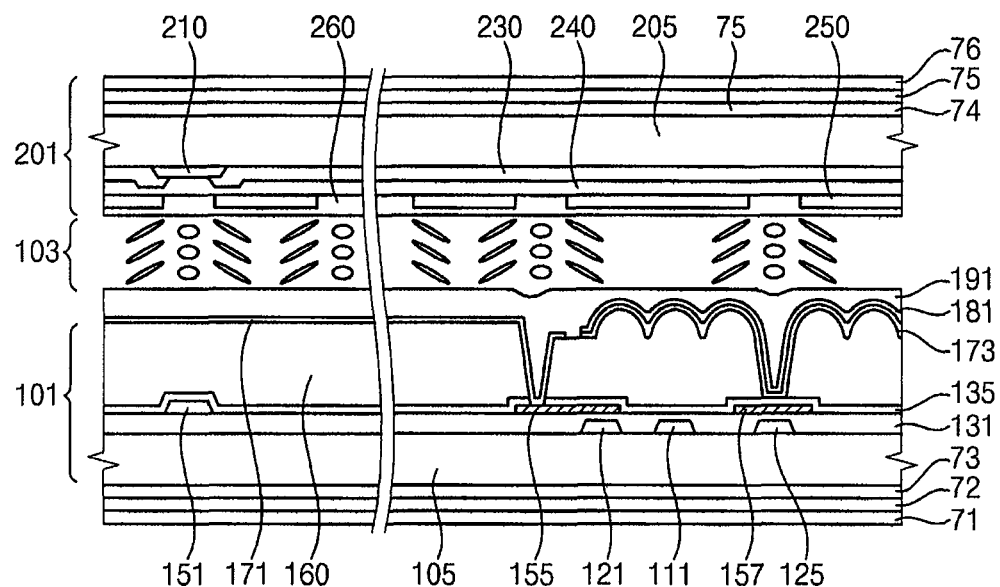
FIG. 3 is a cross-sectional view illustrating the LCD device taken along a line I-I' in FIG. 2.
Figure 4A:
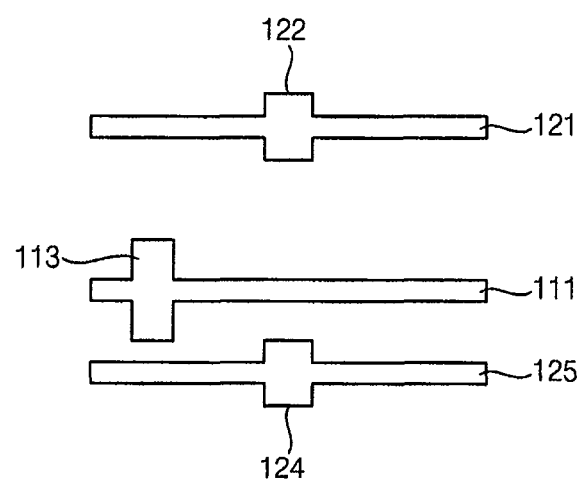
FIGS. 4A to 4C are processing diagrams illustrating a method of manufacturing an array substrate illustrated in FIGS. 1 to 3.
Figure 4B:
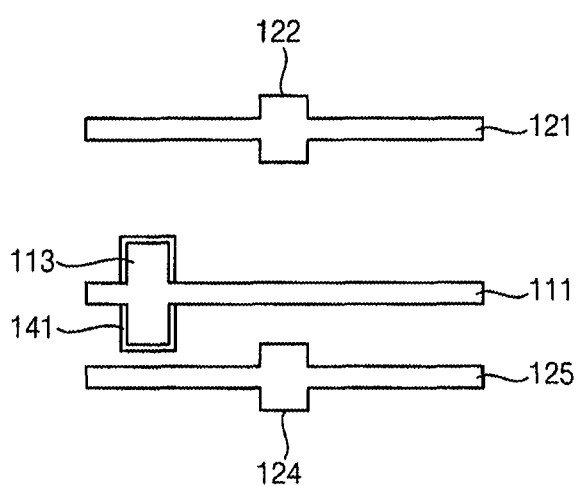
Figure 4C:
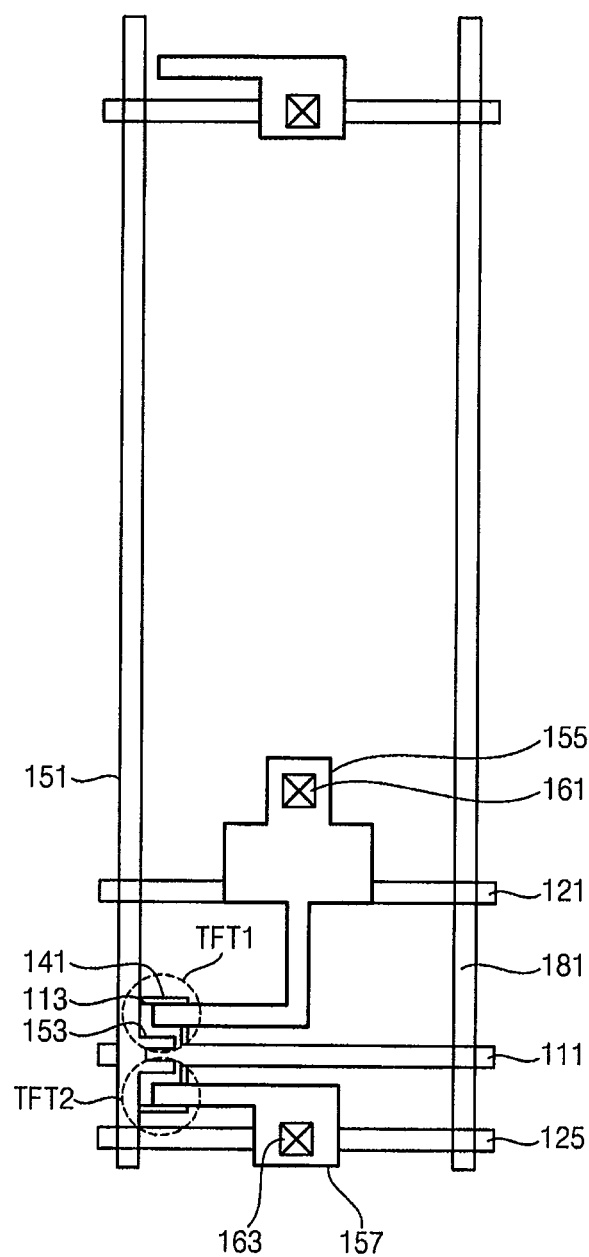

FIG. 3 is a cross-sectional view illustrating the LCD device 100 taken along a line I-I' in FIG. 2. FIGS. 4A to 4C are processing diagrams illustrating a method of manufacturing an array substrate 101 illustrated in FIGS. 1 to 3.

Referring to FIGS. 1 to 3, the array substrate 101 in this example embodiment includes a lower substrate 105, a first switching element TFT1, a second switching element TFT2, a gate line 111, a data line 151, a first boost line 121, a second boost line 125, the transmissive electrode 171 and the reflective electrode 181.

The pixel areas PA01 are determined on the lower substrate 105 by matrix pattern. The pixel area PA01 is referred to as a unit area on which the liquid crystal layer is separately controlled. The pixel areas PA01 may correspond to the R, the G and the B color filters, respectively. The pixel area PA01 may have various shapes such as a rectangular shape, a Z-shape, etc.

In this example embodiment, the pixel area PA01 has a roughly rectangular shape. A first direction D01 is referred to as a direction substantially parallel to a short side of the rectangular shape and a second direction D02 is referred to as a direction substantially parallel to a long side of the rectangular.

In this example embodiment, the pixel area PA01 is divided into a first area A1 and a second area A2 which are adjacent to each other. The first area A1 and the second area A2 are arranged along the second direction D02 and the second area A2 may have larger than the first area A1.

The first switching element TFT1 and the second switching element TFT2 may be a three-terminal element which has a gate electrode 113, a semiconductor layer 141, a source electrode 153 and a drain electrode 155 or 157.

The semiconductor layer 141 is formed on the gate electrode 113. The source electrode 153 and the drain electrodes 155 and 157 face each other on the semiconductor layer 141. The semiconductor may include an active layer and resistant-contact layer on the active layer. The active layer may include amorphous silicon or polysilicon.

In a method of manufacturing an array substrate 101 in this example embodiment of the present invention, the array substrate 101 in this example embodiment includes a lower substrate 105, the first boost line 121, the second boost line 125, the gate line 111 between the first boost line 121 and the second boost line 125, and the gate electrode 113 are formed.

Referring to FIG. 4A, a gate metal layer is formed on the lower substrate 105 by sputtering method and the gate line 111 is firmed by etching the gate metal layer. The gate line 111 may have a three-layer structure including titanium, aluminum, and titanium. The gate line 111 may be formed on the lower substrate 105 to extend along the first direction D01. The gate line 111 is formed across the second area A2. The reflective electrode 181 described later is formed on the second area A2. Thus, the gate line 111 may not decrease the aperture ratio of the pixel area PA01.

The gate electrodes 113 of the TFT1 and the TFT2, as shown in FIG. 4A, extend from the gate line 111. Alternatively, the gate electrodes 113 of the TFT1 and the TFT2 may be integrally formed.

The first and the second boost lines 121 and 125 may be formed on the upper surface of the lower substrate 105 and may be formed using the gate metal of the gate line 111. The first and the second boost lines 121 and 125 may be formed on both sides of the gate line 111 and substantially parallel to the gate line 111. In this example embodiment, the first and the second boost lines 121 and 125 are formed to cross the second area A2 for increasing aperture ratio of the pixel area PA01.

The array substrate 101 may further include a first insulation layer 131. The first insulation layer 131 is formed on the gate line 111, the first boost line 121, and the second boost line 125. The first insulation layer 131 may be formed using insulation material such as silicon nitride or silicon oxide. The semiconductor layers 141 of the TFT1 and the TFT2 are formed on the first insulation layer 131.

The data line 151, as shown in FIG. 4C, is formed on the first insulation layer 131. The data line 151 may extend along the second direction D02 to cross the gate line 111. The source electrodes 153 may extend from the data line 151 toward on the semiconductor layer 141.

One end of a first drain electrode 155 of the TFT1 faces the source electrode 153 on the semiconductor layer 141 and the other end of the first drain electrode 155 may extend to fringe area of the first area A1. The first drain electrode 155 may be formed to partially overlap the first boost line 121. One end of a second drain electrode 157 of the TFT2 faces the source electrode 153 on the semiconductor and the other end of the second drain electrode 157 may be formed on the second area A2. The second drain electrode 157 may be formed to partially overlap the second boost line 125.

The array substrate 101 may further include a passivation layer 135 and a second insulation layer 160. The passivation layer 135 is formed on the data line 151, the TFT1, and the TFT2. The second insulation layer 160 may be formed on the passivation layer 135 using organic insulation materials. Contact holes 161 and 163 may be formed on the second insulation layer 160 and the passivation layer 135. The contact holes 161 and 163 partially expose the first and the second drain electrodes 155 and 157.

The LCD device 100 may further include a drive part. The drive part may include a data drive portion 10 and a gate drive portion 30. The data drive portion 10, as shown in FIG. 1, is formed on an upper portion of a peripheral area of the lower substrate 105 not covered by the counter substrate 201. The gate drive portion 30 is formed on a left side portion of the peripheral area. The data drive portion 10 and the gate drive portion 30 may be formed as a data drive IC 10 and a gate drive IC 30. Alternatively, the data drive portion 10 and the gate drive portion 30 may be integrally formed as a single chip.

A flexible printed circuit film (FPC) 20 is electrically connected with the upper portion of a peripheral area. Input terminals of the data drive IC 10 and the gate drive IC 30 may be electrically connected with the FPC by external connecting lines 35. The gate line 111, the first boost line 121 and the second boost line 125 may be electrically connected with output terminals of the gate drive IC 30.

Figure 5:
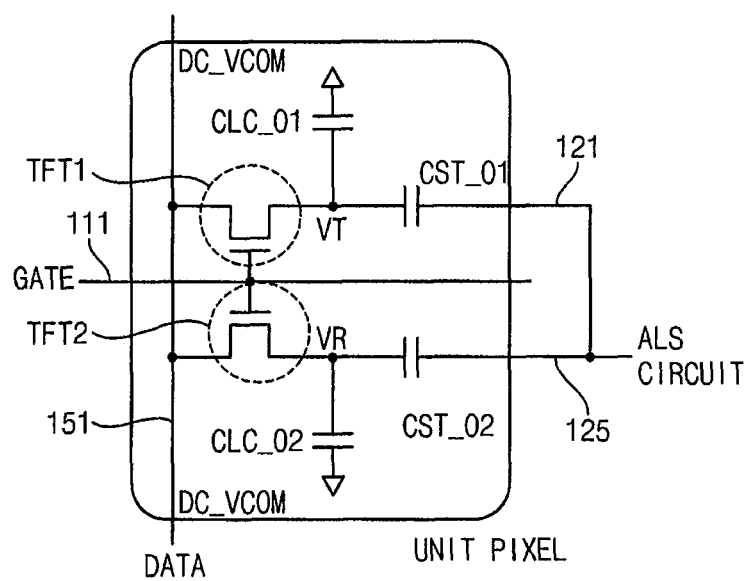
FIG. 5 is an equivalent circuit diagram illustrating elements in the unit pixel area in FIG. 2.

FIG. 5 is an equivalent circuit diagram illustrating elements in the unit pixel area PA01 in FIG. 2.

Referring to FIGS. 1 and 5, the data line 151 is electrically connected with output terminals of the data drive IC 10. The data drive portion 10 applies data signals to the data line 151s based on external image signals. The data signals are commonly applied to the source electrodes 153 of the TFT1 and the TFT2 through the data line 151.

The gate drive portion 30 applies gate signals to the gate line 111s based on the external image signals. The gate signals are commonly applied to the gate electrodes 113 of the TFT1 and the TFT2 through the gate line 111.

When the gate signal is applied to the gate electrodes, the data signals applied to the source electrodes 153 are drained to the first and the second drain electrodes 155 and 157. Thus, the data signals are commonly applied to the first and the second drain electrodes 155 and 157.

The first boost line 121, the first insulation layer 131, and the first drain electrode 155 may form a first storage capacitor CST01. The second boost line 125, the second insulation layer 160, and the second drain electrode 157 may form a second storage capacitor CST02.

In this example embodiment, the gate drive portion 30 may apply a first boost signal and a second boost signal to the first and the second boost line 125s, respectively. The first boost capacitor may be controlled by the first boost signal. Thus, the voltage level of the data signal applied to the first drain electrode 155 may be boosted to a first pixel voltage due to the first storage capacitor CST01. The second boost capacitor may be controlled by the second boost signal, and thus the voltage level of the data signal applied to the second drain electrode 157 may be boosted to a second pixel voltage due to the second storage capacitor CST02.

The transmissive electrode 171, as illustrate in FIGS. 2 and 3, may be formed on the second insulation layer 160 corresponding to the first area A1. Transmissive and conductive material such as indium tin oxide (ITO) or indium zinc oxide (IZO) is deposited on the second insulation layer 160 and may be patterned into the transmissive electrode. The transmissive electrode extends through a first contact hole formed on the second insulation layer 160 and contacts with the first drain electrode 155. Thus, the first pixel voltage may be applied to the transmissive electrode 171.

When the transmissive electrode 171 is formed, a conductive layer 173 of ITO or IZO is formed on the second area A2. The conductive layer 173 extends through a second contact hole which is formed on the second insulation layer 160 and contacts with the second drain electrode 157.

The reflective electrode 181, as illustrated in FIGS. 2 and 3, is formed on the conductive layer 173 on the second area A2. The reflective electrode is formed of a high-reflective metal layer such as thin aluminum layer. Thus, the reflective electrode 181 is connected with the conductive layer 173 and the data signal or the second pixel voltage may be applied to the reflective electrode 181.

A convex and concave pattern may be formed on the second insulation layer 160 corresponding to the second area A2 to diffuse light incident into the reflective electrode 181. The size of the convex and concave pattern illustrated in FIG. 3 is exaggerated, and thus the thicknesses between the lower substrate 105 and the transmissive electrode 171 or the reflective electrode 181 are substantially equal to each other.

The array substrate 101 may further include a first alignment layer 191. The first alignment layer is formed on the transmissive electrode 171, the reflective electrode, and the second insulation layer 160. The first alignment layer 191 may determine the pretilt of the liquid crystal layer 103.

Referring to FIGS. 1 and 3 again, the counter substrate 201 may include an upper substrate 205, a black matrix 210, a color filter 230, an overcoat layer 240, a common electrode 250, and a second alignment layer 260.

The upper substrate 205 faces the lower substrate 105 and is formed of glass or plastic like the lower substrate 105.

The black matrix 210 is formed on the upper substrate 205 corresponding to the TFT1, TFT2, the data line 151, and the gate line 111. The black matrix 210 may be formed of organic material or metal including chromium.

The color filter 230 is formed on the upper substrate 205 corresponding to the pixel area PA01 by a printing method or a photolithography method using color photoresist. The color filter 230 may include R, G and B color filter 230. The overcoat layer 240 covers the color filter 230 and the black matrix 210 for planarization.

The common electrode 250 is formed on the overcoat layer 240 using ITO or IZO. The common electrode 250 is electrically connected with a com terminal of the data drive IC 10 through a common voltage line which may be formed of ITO or IZO. A plurality of slits, as illustrated in FIG. 3, may be formed on the common electrode 250 so that the pixel area PA01 may be divided into several domains. The second alignment layer 260 is formed on the common electrode 250.

The liquid crystal layer 103 is disposed between the first and the second alignment layers 191 and 260. Liquid crystal of the liquid crystal layer 103 may be aligned along a vertical direction from the array substrate 101 toward the counter substrate 201 so that the liquid crystal layer 103 is formed along vertical mode.

In this example embodiment, the cell gaps of the liquid crystal layer 103 on the transmissive electrode 171 and the reflective electrode 181 are formed substantially equal to each other. Thus, the LCD device 100 of the present invention has a mono-cell gap and is driven as transflective-type.

Thus, when first light and second light transmit the liquid crystal layer 103 on the transmissive electrode 171 and the reflective electrode 181, respectively, transmission lengths of the first and the second lights for the liquid crystal layer 103 are different from each other. Thus, when the liquid crystal layer 103 is driven along single pattern on the transmissive electrode 171 and the reflective electrode 181, the retardations of the first and the second light are different from each other so that the LCD device 100 may not normally display an image.

In the present invention, voltages having different levels are applied to the transmissive electrode 171 and the reflective electrode 181 so that the retardations of the first and the second light may be substantially equal to each other.

Figure 6:
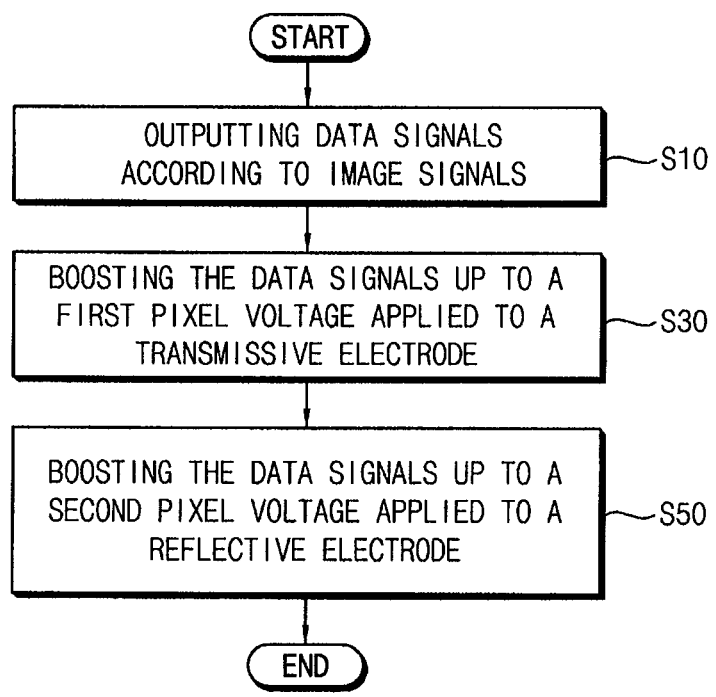
FIG. 6 is a flowchart illustrating a method for driving the LCD device illustrated in FIGS. 1 to 5.

FIG. 6 is a flowchart illustrating a method for driving the LCD device 100 illustrated in FIGS. 1 to 5.

According to example embodiment, in a method for driving the LCD device 100, the LCD device 100 is driven by ALS driving method. For example, the data signals are boosted by boost lines and the boosted data signals having different voltage levels are applied to the transmissive and the reflective electrode 181, respectively.

Referring to FIG. 6, data signals are outputted according to external image signals (step S10). For example, the data drive portion 10 outputs data signals to the data line 151 according to image signals from a graphic card. The gate drive portion 30 outputs gate signals to the gate line 111 according to the image signals.

Figure 7A:
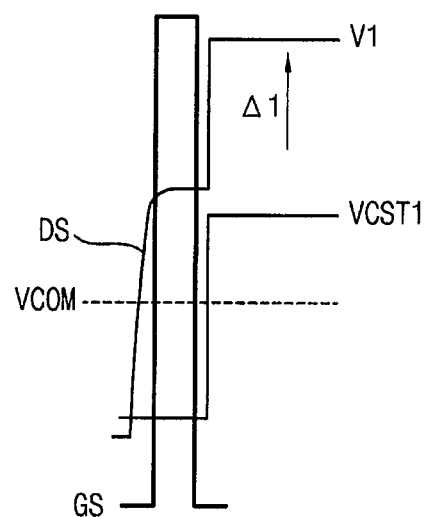
FIG. 7A is waveform diagram illustrating the relation among a control signal, a data signal, a first boost signal, a common voltage and a first pixel voltage.
Figure 7B:
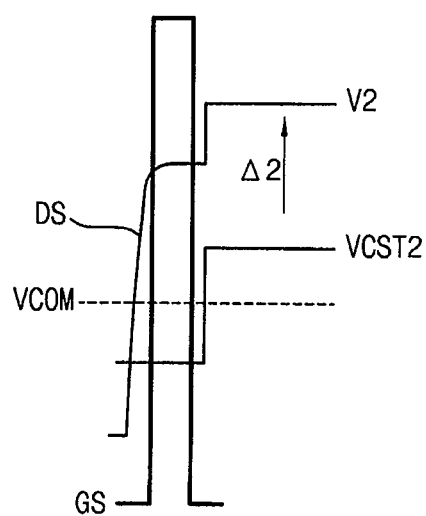
FIG. 7B is waveform diagram illustrating the relation among a control signal, a data signal, a second boost signal, a common voltage and a second pixel voltage.

FIG. 7A is waveform diagram illustrating the relation among a control signal GS, a data signal DS, a first boost signal VCST1, a common voltage VCOM and a first pixel voltage V1. FIG. 7B is waveform diagram illustrating the relation among a control signal GS, a data signal DS, a second boost signal VCST2, a common voltage VCOM and a second pixel voltage V2.

Referring to FIG. 7A, the data signal DS is boosted to the first pixel voltage V1 by the first boost signal VCST1 (step S30). As mentioned above, when the gate signal is applied to the gate electrode 113 of the TFT1, the data signal DS applied to the source electrode 153 of the TFT1 is applied to the first drain electrode 155 of the TFT1.

The first boost signal VCST1 which is synchronized with the data signal DS is applied to the first boost line 121. The first boost signal VCST1 may have voltage level much higher than common voltage VCOM level of the common electrode 250. Thus, the data signal DS is boosted to the first pixel voltage V1 by the first storage capacitor CST01 and the first pixel voltage V1 is applied to the transmissive electrode.

When the first pixel voltage V1 is applied to the transmissive electrode 171, the alignment of the liquid crystal layer 103 on the transmissive electrode 171 may vary. Thus, the first light passing through the liquid crystal layer 103 on the transmissive electrode 171 undergoes a first retardation.

Referring to FIG. 7B, the data signal DS is boosted to the second pixel voltage V2 by the second boost signal VCST2 (step S50). Boosting for the data signal DS to the second pixel voltage V2 is substantially simultaneous with boosting for the data signal DS to the first pixel voltage V1.

When the gate signal is applied to the gate electrode 113 of the TFT2, the data signal DS applied to the source electrode 153 of the TFT2 is applied to the second drain electrode 157 of the TFT2. The second boost signal VCST2 synchronized with the data signal DS is applied to the second boost line 125. The second boost signal VCST2 may have voltage level higher than common voltage VCOM level of the common electrode 250. Thus, the data signal DS is boosted to the second pixel voltage V2 by the second storage capacitor CST02 and the second pixel voltage V2 is applied to the reflective electrode 181.

When the second pixel voltage V2 is applied to the reflective electrode 181, the alignment of the liquid crystal layer 103 on the reflective electrode 181 may vary. Thus, the second light undergoes a second retardation by the liquid crystal layer 103 before and after reflection on the reflective electrode.

The first and the second pixel voltages V1 and V2 may be determined by formula 1 mentioned below.

$$Vp = Vd \pm \Delta = Vd \pm [Cst/(Cst+CLc)](Vh-VL) \quad \text{Formula 1}$$

In Formula 1, Vp is referred to as a pixel voltage, Vd is referred to as voltage of a data signal DS applied to a drain electrode of TFT, $\Delta$ is referred to as boosted voltage level which varies due to capacitive coupling according to voltage level of a boost signal, Cst is referred to as the capacity of a storage capacitor, CLc is referred to as the capacity of a liquid crystal capacitor, Vh is referred to as the high level voltage of the boost signal and VL is referred to as the low level voltage of the boost signal.

In the method for driving the LCD device 100 according to example embodiment, the voltage levels of the first and the second boost signals VCST1 and VCST2 are controlled so as to control the first and the second retardations to be substantially equal to each other.

Figure 8:
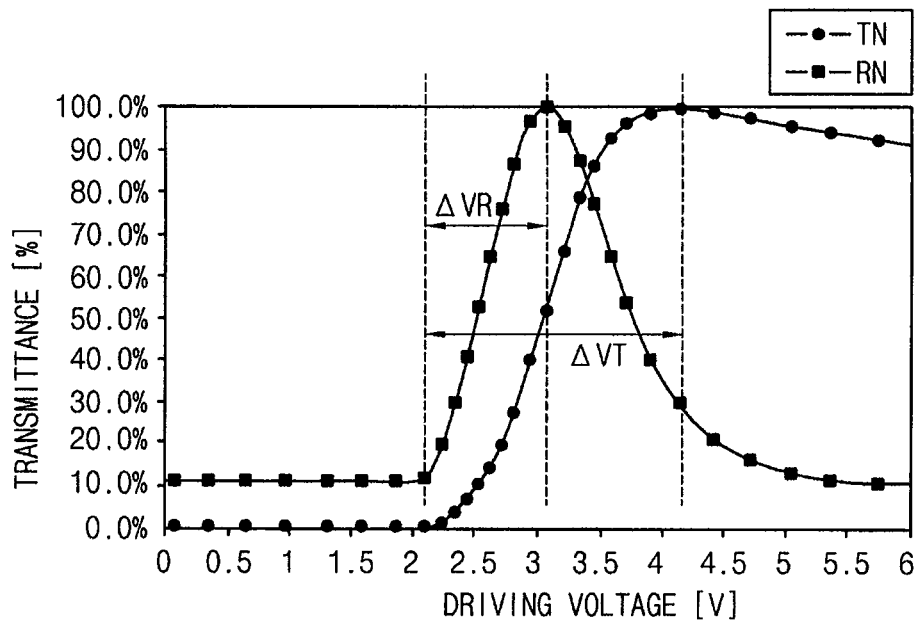
FIG. 8 is a voltage-transmittance graph of a transmissive electrode and a reflective electrode illustrating the relation between light transmittance for the first pixel voltage and the second pixel voltage.

FIG. 8 is a voltage-transmittance graph of a transmissive electrode 171 and a reflective electrode 181 illustrating the relation between light transmittance for the first pixel voltage V1 and the second pixel voltage V2.

In the graph illustrated in FIG. 8, a vertical axis indicates transmittances of the liquid crystal layer 103 on the transmissive electrode 171 and the reflective electrode 181 which is normalized by percent. A horizontal axis indicates the voltage levels of the first and the second pixel voltages V1 and V2.

The graph in FIG. 8 reveals the results of observing the transmittance of the first and the second light for the liquid crystal layer 103 on the transmissive electrode 171 and the reflective electrode 181 when the cell gaps on the transmissive electrode 171 and the reflective electrode 181 are substantially equal to each other, for example, about 3.3 μm to 3.5 μm.

Referring to voltage-transmittance graph for the transmissive electrode 171 in FIG. 8 which is indicated by circular dots, when the first pixel voltage V1 is under about 2 V, the transmittance is nearly about zero. When the first pixel voltage V1 varies from 2.0 V to 4.3 V, the transmittance is increased from 0% to 100%. Also, when the first pixel voltage V1 is increased over 4.3 V, the transmittance is gradually decreased. Thus, the range of the first pixel voltage V1 is desirably from 2.0 V to 4.3 V so that the first voltage varies from the minimum to the maximum.

Referring to voltage-transmittance graph for the reflective electrode 181 in FIG. 8 which is indicated by square dots, when the second pixel voltage V2 is under about 2 V and over 5.5 V, the transmittance is about 10%. When the second pixel voltage V2 varies from 2.0 V to 3.1 V, the transmittance is rapidly increased from 10% to 100%. Also, when the second pixel voltage V2 is increased from 3.1 V to 5.5 V, the transmittance is decreased from 100% to 10%. Thus, the range of the second pixel voltage V2 is desirably from 2.0 V to 3.1 V so that the second voltage varies from the minimum to the maximum.

The absolute amount of passing through light for the liquid crystal layer 103 on the transmissive electrode 171 and the reflective electrode 181 may be different from each other but different voltages may be applied to the transmissive electrode 171 and the reflective electrode 181, respectively, so that the transmittances of the liquid crystal layer 103 on the transmissive electrode 171 and the reflective electrode 181 are equal to each other. When the transmittances of the liquid crystal layer 103 on the transmissive electrode 171 and the reflective electrode 181 are equal to each other, the first and the second retardations may be substantially equal to each other.

For example, when the transmittance in FIG. 8 is 50%, the first pixel voltage V1 is about 3.1 V and the second pixel voltage is about 2.5 V Thus, the voltage of the data signal DS, the first and the second pixel voltages V1 and V2 are known, and thus the voltages of the first and the second boost signals VCST1 and VCST2 may be determined from Formula 1.

Figure 9:
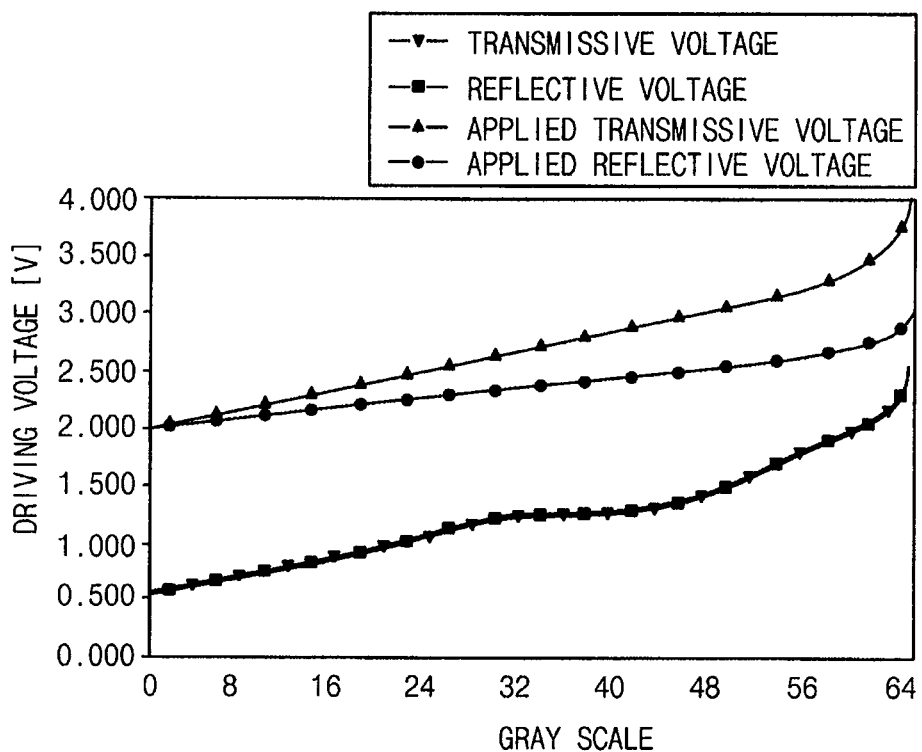
FIG. 9 is a gray scale-driving voltage graph illustrating differential driving voltages forming a gray scale on the transmissive electrode and reflective electrode substantially equal to each other.
Figure 10:
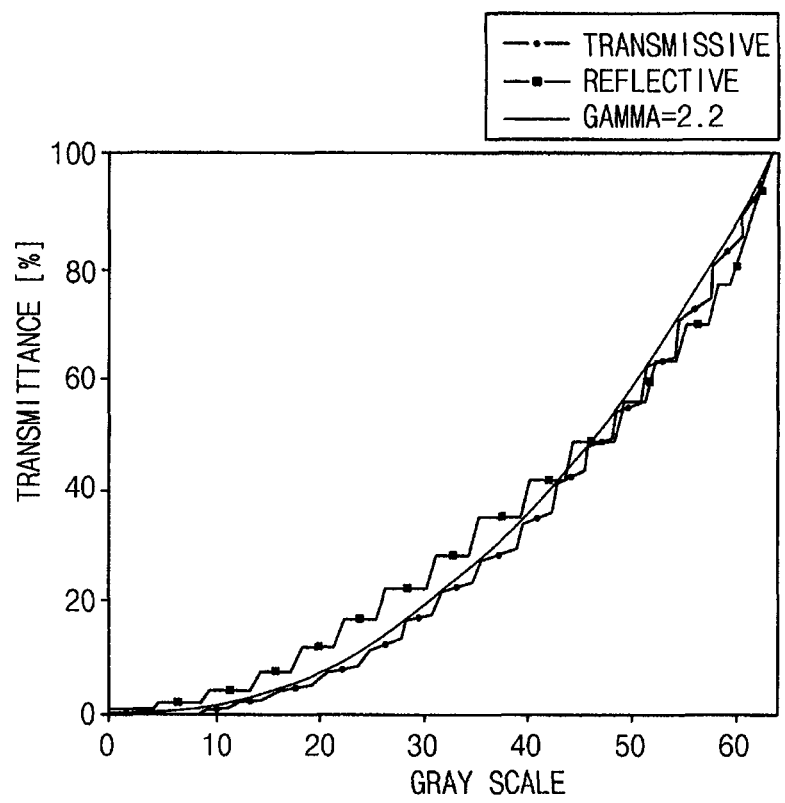
FIG. 10 is a gray scale-transmittance graph when the differential driving voltages are applied to the transmissive electrode and reflective electrode, respectively, and gammas are controlled to be equal to each other.

FIG. 9 is a gray scale-driving voltage graph illustrating differential driving voltages forming a gray scale on the transmissive electrode 171 and reflective electrode 181 substantially equal to each other. FIG. 10 is a gray scale-transmittance graph when the differential driving voltages are applied to the transmissive electrode 171 and reflective electrode 181, respectively, and gammas are controlled to be equal to each other.

Referring to FIG. 9, a horizontal axis indicates gray scale of an image displayed by the LCD device 100. A vertical axis indicates voltage that is applied to the transmissive electrode or the reflective electrode 181. Transmittances of the liquid crystal layer 103 on the transmissive electrode 171 and the reflective electrode 181 are normalized by percent.

Referring to FIG. 9, first pixel voltage V1-gray scale graph is indicated by triangular dots and second pixel voltage V2-gray scale graph is indicated by circular dots. The slope of the first pixel voltage V1-gray scale graph is steeper than that of the second pixel voltage V2-gray scale graph. When the gray scale varies from 0 gray scale to 64 gray scale, the first pixel voltage varies, as illustrated in FIG. 8, from about 2.0 V to about 4.3 V and the second pixel voltage varies from about 2.0 V to about 3.1 V. Thus, on the same gray scale the first pixel voltage V1 is higher than the second pixel voltage and voltage difference between the first and the second pixel voltages V1 and V2 is increased according to increasing gray scale.

In FIG. 10, a horizontal axis indicates gray scale of image displayed by the LCD device 100. A vertical axis indicates transmittances of the transmissive electrode or the reflective electrode 181. Referring to FIG. 10, when gamma which is a parameter related to the gray is about 2.2, transmittance graph of the transmissive electrode indicated by circular dots is close to an ideal gray-transmittance graph indicated by a solid line, and the transmittance graph of the reflective electrode 181 indicated by square dots is close to the ideal gray-transmittance graph indicated by a solid line.

Thus, when the first and the second pixel voltages V1 and V2 having different levels according to gray are applied to the transmissive electrode 171 and the reflective electrode 181, respectively, the transmittances of the liquid crystal layer 103 on the transmissive electrode 171 and the reflective electrode 181 which is normalized may be substantially equal to each other. Thus, when the first and the second boost signal VCST2 is determined by Formula 1 according to the gray, the LCD device 100 may display an image with prescribed gray.

Figure 11A:
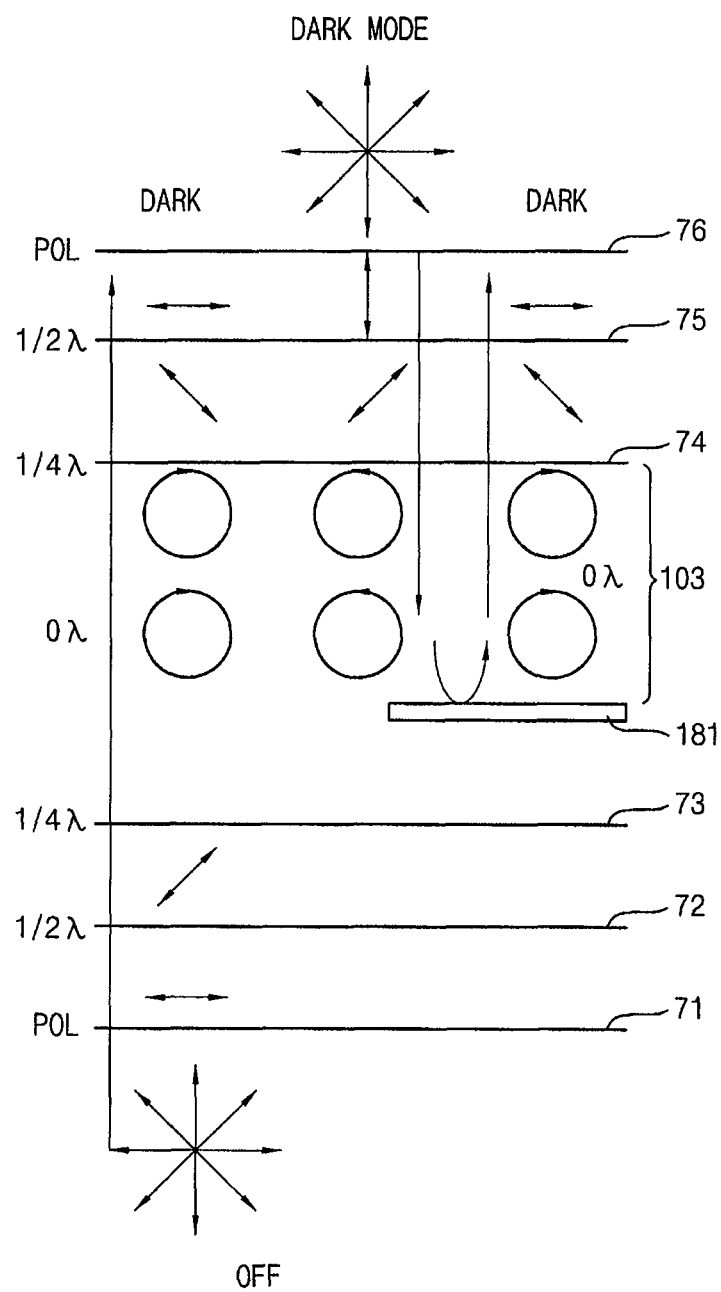
FIGS. 11A and 11B are diagrams illustrating polarization on the transmissive electrode and reflective electrode when the LCD device is driven according to the method illustrated in FIGS. 6 to 10.
Figure 11B:
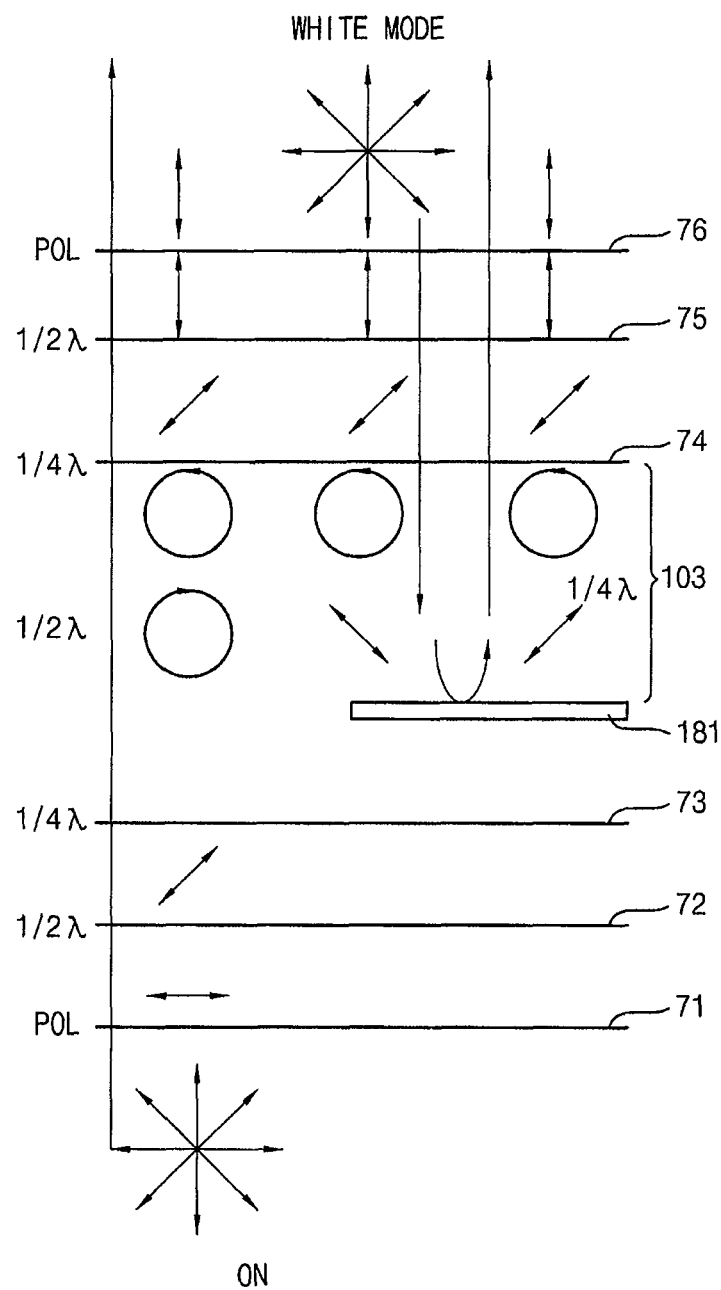

FIGS. 11A and 11B are diagrams illustrating polarization on the transmissive electrode 171 and reflective electrode 181 when the LCD device 100 is driven according to the method illustrated in FIGS. 6 to 10.

Dark mode is illustrated in FIG. 11A as an off state when the first and the second pixel voltages are not applied to the transmissive electrode 171 and the reflective electrode 181. White mode is illustrated in FIG. 11B as an on state when the first and the second pixel voltages are applied to the transmissive electrode 171 and the reflective electrode 181.

Optical modes including the dark mode and the white mode illustrated in FIGS. 11a and 11b may include mPVA mode (mobile patterned vertical alignment mode). Alternatively, another optical mode may be adopted in the LCD device 100. For example, white mode is displayed on off-state and dark mode is displayed on on-state in another optical mode in another optical mode. Another optical mode may include a TN mode or an ECB mode.

Referring to FIGS. 3, 11A, and 11B, the LCD device 100 may further include a first polarizing plate 71, a first ½λ plate 72, a first ¼λ plate 73, a second ¼λ plate 74, a second ½λ plate 75, and a second polarizing plate 76.

The first ¼λ plate 73 is disposed on a rear face of the array substrate 101. The first polarizing plate 71 is disposed under the first ¼λ plate 73. The first ½λ plate 72 may be disposed between the first ¼λ plate 73 and the first polarizing plate 71. The second ¼λ plate 74 is disposed on an upper face of the counter substrate 201. The second polarizing plate 76 is disposed on the second ¼λ plate 74. The second ½λ plate 75 may be disposed between the second ¼λ plate 74 and the second polarizing plate 76.

The first light being incident into the first polarizing plate 71 in FIG. 11a is linearly polarized by the first polarizing plate 71 and the first ½λ plate 72. Then the first light is circularly polarized along a first polarizing direction by the first ¼λ plate 73 and is incident into the liquid crystal layer 103 through the transmissive electrode 171. The first polarizing direction is used so as to discriminate circular polarizing direction for convenience.

The liquid crystal layer 103 maintains the polarizing direction of the first light on the off-state. Thus, the first light which is circularly polarized along the first polarizing direction may be linearly polarized by the second ¼λ plate 74 and the second ½λ plate 75. The first light is cut by the second polarizing plate 76 whose polarizing axis is perpendicular to that of the first polarizing plate 71 so that the dark mode may be displayed.

The second light being incident into the second polarizing plate 76 is linearly polarized by the second polarizing plate 76 and the second ½λ plate 75. Then the second light is circularly polarized along a second polarizing direction by the second ¼λ plate 74 and is incident into the liquid crystal layer 103 through the reflective electrode 181. The second polarizing direction is referred to as a direction having 180 degree phase difference with respect to the first polarizing direction.

The polarizing direction of the second light passing through the liquid crystal layer 103 may not vary on the off-state. When the second light is reflected on the reflective electrode 181, the phase of the second light is inverse to the second polarizing direction. Thus, the second light after reflection may be circularly polarized light along the first polarizing direction and is again incident into the second ¼λ plate 74. The second light which is circularly polarized light along the first polarizing direction is linearly polarized by the second ¼λ plate 74 and the second ½λ plate 75. The second light is cut by the second polarizing plate 76 so that the dark mode may be displayed.

Thus, the dark mode is displayed on the transmissive electrode 171 and the reflective electrode 181 on the off-state.

Referring to FIG. 11B, the cell gap is constant on the transmissive electrode 171 and the reflective electrode 181. The liquid crystal layer 103 may alter the polarizing direction of incident light. The liquid crystal layer 103 is realigned due to electric field generated by the transmissive electrode 171 which the first pixel voltage V1 is applied to and the common electrode 250. Thus, the first light passing through the liquid crystal layer 103 may experience ½λ phase difference. Thus, the first light that is circularly polarized along the first polarizing direction is circularly polarized along the second polarizing direction by the liquid crystal layer 103. The first light that is circularly polarized along the second polarizing direction may be linearly polarized by the second ¼λ plate 74 and the second ½λ plate. The first light transmits the second polarizing plate 76 so that the white mode may be displayed.

The liquid crystal layer 103 is realigned due to an electric field generated by the reflective electrode 181 which the second pixel voltage V2 is applied to and the common electrode 250. Thus, the second light passing through once the liquid crystal layer 103 on the reflective electrode 181 may experience ¼λ phase difference. Thus, the second light that is circularly polarized along the second polarizing direction is linearly polarized by the liquid crystal layer 103 and is incident into the reflective electrode 181. The second light has a phase inversion before and after reflection on the reflective electrode 181 and the second light, linearly polarized light, transmits the liquid crystal layer 103 again. The phase of the second light is altered by ¼λ due to the liquid crystal layer 103 so that the second light is circularly polarized along the second direction D02. The second light may be linearly polarized by the second ¼λ plate 74 and the second ½λ plate. The second light transmits the second polarizing plate 76 so that the white mode may be displayed.

Thus, the white mode is displayed on the transmissive electrode 171 and the reflective electrode 181 on the on-state. Thus, according to the method for driving the LCD device 100, the dark mode and the white mode are embodied and the prescribed image may be displayed by controlling the first and second boost signals VCST1 and VCST2.

Figure 12:
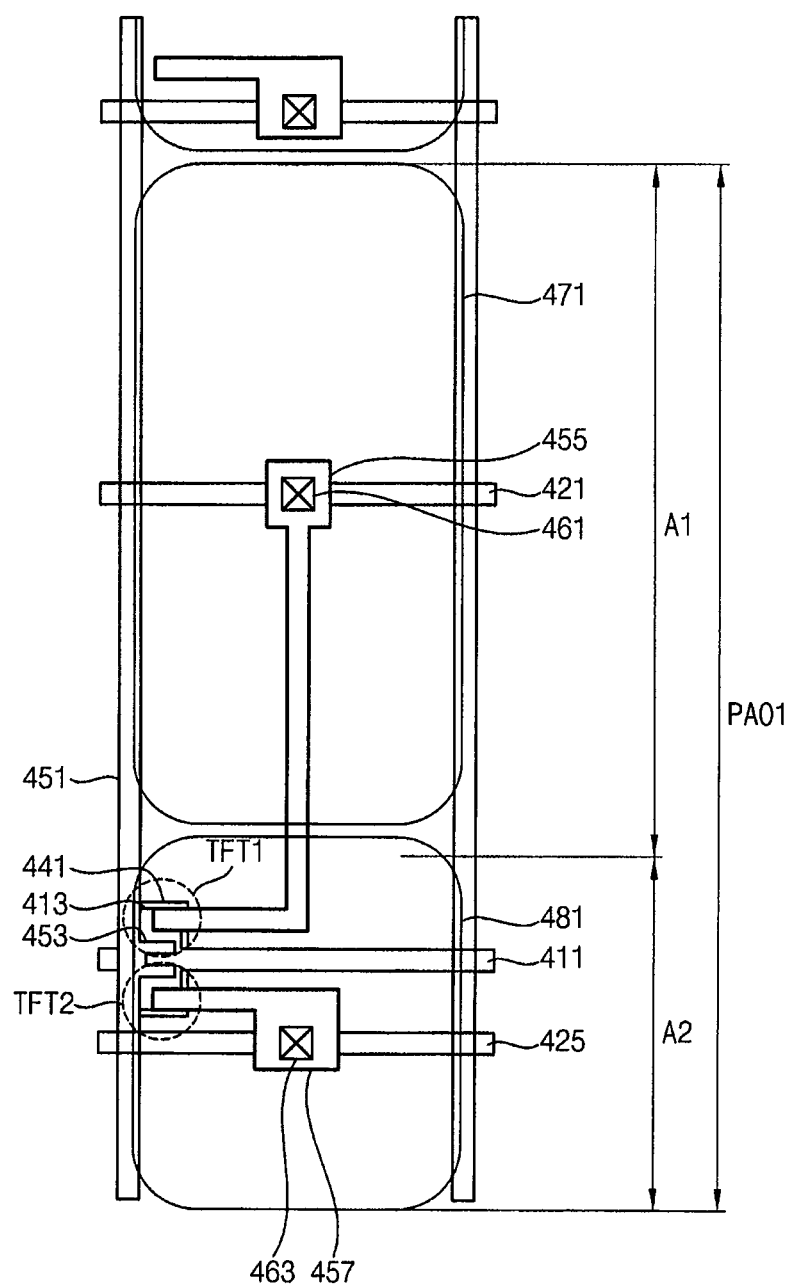
FIG. 12 is a plan view illustrating a unit pixel area of an array substrate in accordance with another example embodiment of the present invention.

FIG. 12 is a plan view illustrating a unit pixel area PA01 of an array substrate 401 in accordance with another example embodiment of the present invention.

Referring to FIG. 12, an array substrate 401 and a method of manufacturing the array substrate 401 are substantially equal to the array substrate 101 and the method of manufacturing the array substrate 101 illustrated in FIGS. 1 to 5 except that the position of a first boost line 421 is altered and that a first drain electrode 455 of a TFT1 extends to a middle of a first area A1. Thus, corresponding reference numbers are used for corresponding elements and repetitive descriptions are omitted.

In this example embodiment, the first boost line 421 is formed to be parallel to a gate line 411 and to cross the first area A1 of a pixel area PA01, for example, to cross the center of the first area A1. The first drain electrode 455 extends to a middle of a first area A1. The end portion of the first drain electrode 455 may overlap the first boost line 421 to form the first storage capacitor CST01.

According to this example embodiment, distances between the gate line 411, and the first and the second boost line 425 may be formed longer than that of the LCD device 100 illustrated in FIGS. 1 to 5. Thus, processing margins of the gate line 411, and the first and the second boost line 425 may have enough margins.

An LCD device in accordance with this example embodiment is substantially equal to the LCD device 100 illustrated in FIGS. 1 to 5 except including the array substrate 401 illustrated in FIG. 12. Thus, a corresponding reference numbers are used for corresponding elements and repetitive descriptions are omitted.

A method for driving an LCD device in accordance with this example embodiment is substantially equal to the method for driving the LCD device 100 illustrated in FIGS. 6 to 11B. Thus, repetitive descriptions are omitted.

Figure 13:
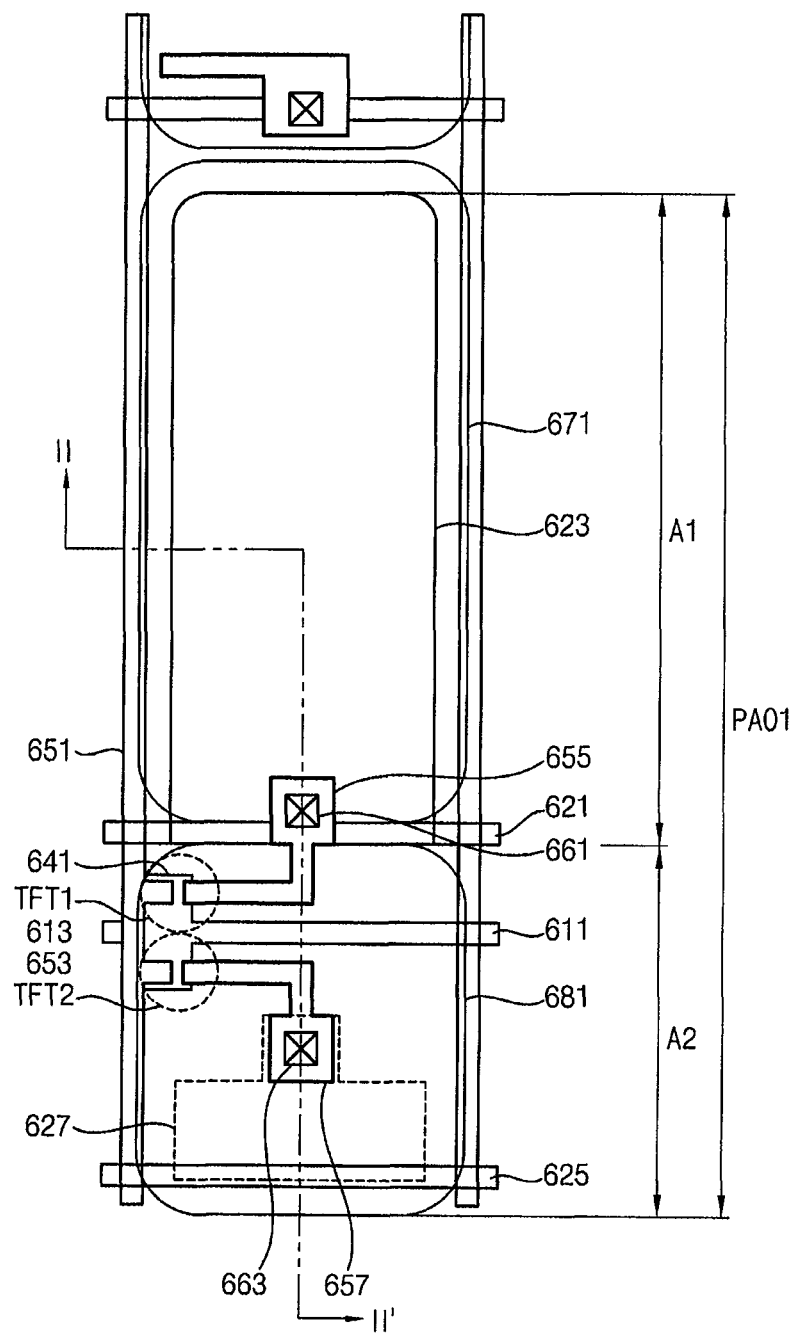
FIG. 13 is a plan view illustrating a unit pixel area of an array substrate in accordance with further another example embodiment of the present invention.
Figure 14:
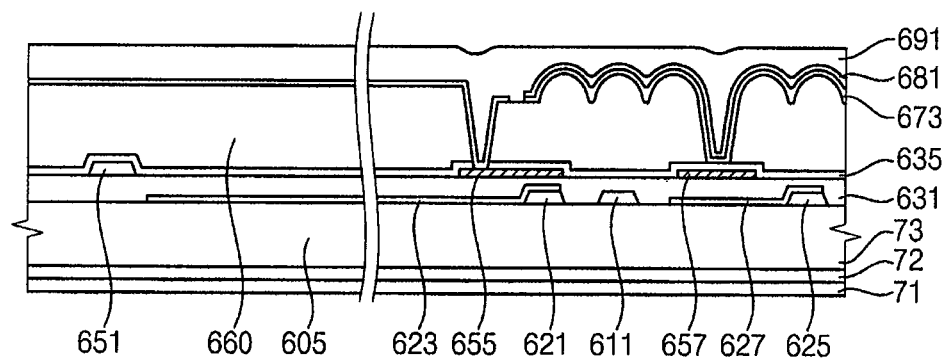
FIG. 14 is a cross-sectional view illustrating the array substrate taken along a line II-II' in FIG. 13.

FIG. 13 is a plan view illustrating a unit pixel area PA01 of an array substrate 601 in accordance with another example embodiment of the present invention. FIG. 14 is a cross-sectional view illustrating the array substrate taken along a line II-II' in FIG. 13.

Referring to FIGS. 13 and 14, an array substrate 601 and a method of manufacturing the array substrate 601 are substantially equal to the array substrate 101 and the method of manufacturing the array substrate 101 illustrated in FIGS. 1 to 5 except they further include the forming of a first storage electrode and a second storage electrode. Thus, corresponding reference numbers are used for corresponding elements and repetitive descriptions are omitted.

In this example embodiment, the first storage electrode is formed of ITO or IZO. The first electrode is formed on a lower substrate 605 corresponding to a first area A1 of a pixel area PA01. The first storage electrode has a smaller area than that of the transmissive electrode 671 and one side edge of the first storage electrode contacts with an upper face of a first boost line 621.

The first storage electrode increases a first storage capacitor CST01 that is formed between a first drain electrode 655 and the first boost line 621. Thus, line width of the first boost line 621 and the first drain electrode 655 may be decreased.

The second storage electrode is formed of ITO or IZO. The second electrode is formed on a lower substrate 605 corresponding to a second area A2. The second storage electrode has smaller area than that of the reflective electrode 681 and one side edge of the second storage electrode contacts with an upper face of the second boost line 625.

The second storage electrode increases a second storage capacitor CST02 that is formed between a second drain electrode 657 and the second boost line 625. Thus, line width of the second boost line 625 and the second drain electrode 657 may be decreased.

Thus, the array substrate 601 in this example embodiment may have larger aperture ratio than that of the array substrate 101 illustrated in FIGS. 1 to 5.

An LCD device in accordance with this example embodiment is substantially equal to the LCD device 100 illustrated in FIGS. 1 to 5 except it includes the array substrate 601 illustrated in FIGS. 13 and 14. Thus, repetitive descriptions are omitted.

A method for driving an LCD device in accordance with this example embodiment is substantially equal to the driving method for the LCD device 100 illustrated in FIGS. 6 to 11B. Thus, repetitive descriptions are omitted.

Figure 15:
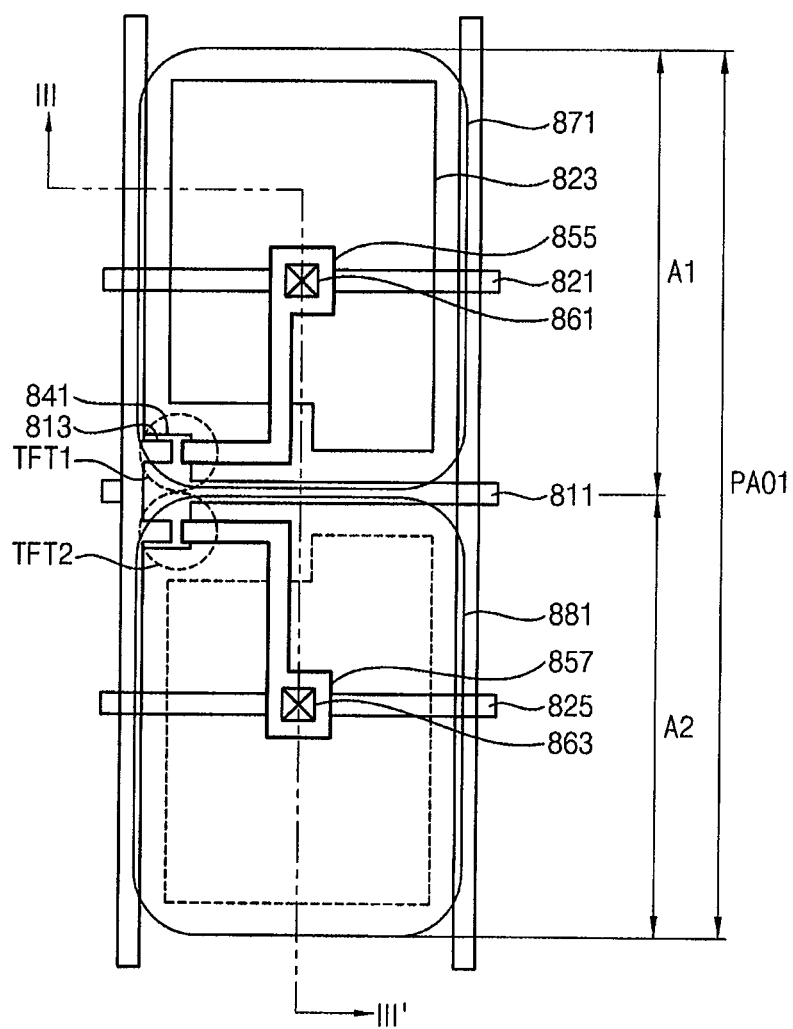
FIG. 15 is a plan view illustrating a unit pixel area of an array substrate in accordance with further still another example embodiment of the present invention.
Figure 16:
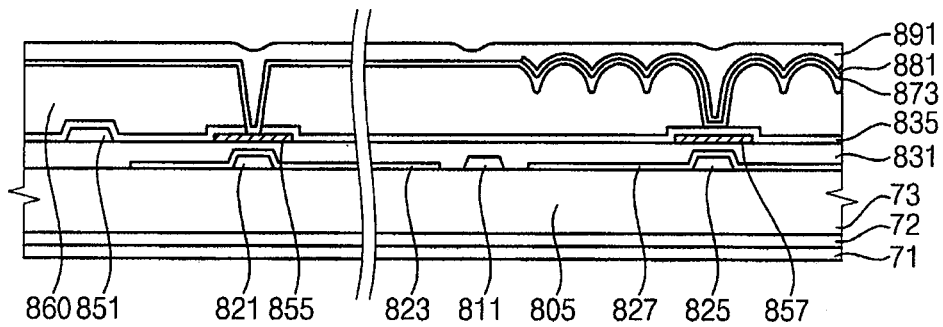
FIG. 16 is a cross-sectional view illustrating the array substrate taken along a line III-III' in FIG. 15.

FIG. 15 is a plan view illustrating a unit pixel area PA01 of an array substrate 801 in accordance with still another example embodiment of the present invention. FIG. 16 is a cross-sectional view illustrating the array substrate taken along a line.

Referring to FIGS. 15 and 16, an array substrate 801 and a method of manufacturing the array substrate 801 are substantially equal to the array substrate 101 and the method of manufacturing the array substrate 101 illustrated in FIGS. 1 to 5 except it further includes a first storage electrode, a second storage electrode, a first boost line 821 disposed on a first area A1 and the first area A1 and a second area A2 having near same area. Thus, a corresponding reference numbers are used for corresponding elements and repetitive descriptions are omitted.

In this example embodiment, the first area A1 and the second area A2 have substantially nearly same area. In this example embodiment, the first boost line 821 is formed to be parallel to a gate line 811 and to cross the first area A1 of a pixel area PA01, for example, to cross the center of the first area A1. The first drain electrode 855 extends to middle of a first area A1. The end portion of the first drain electrode 855 may overlap the first boost line 821 to form the first storage capacitor CST01.

The first and the second storage electrodes may be formed of ITO and IZO. The first and the second storage electrodes may be formed on the first area A1 and the second area A2 and may be formed to cover the first and the second boost lines 821, 825, respectively. Thus, the first and the second storage electrodes are electrically connected with the first and the second boost line 821, 825, respectively.

The first and the second storage electrodes increase a first storage capacitor CST01 and a second storage capacitor CST02, respectively. Thus, according to this example embodiment line width of the first and the second boost line 821, 825 and the first and the second drain electrodes 855, 857 may be decreased. Thus, the array substrate 801 in this example embodiment may have larger aperture ratio than that of the array substrate 101 illustrated in FIGS. 1 to 5.

According to this example embodiment, distances between the gate line 811 and the first boost line 821 or the second boost line 825 may be formed longer than that of the LCD device 100 illustrated in FIGS. 1 to 5. Thus, processing margins of the gate line 811, the first and the second boost lines 821 and 825 may have enough margins.

An LCD device in accordance with this example embodiment is substantially equal to the LCD device 100 illustrated in FIGS. 1 to 5 except it includes the array substrate 801 illustrated in FIGS. 15 and 16. Thus, repetitive descriptions are omitted.

A method for driving an LCD device in accordance with this example embodiment is substantially equal to the method for driving the LCD device 100 illustrated in FIGS. 6 to 11B. Thus, repetitive descriptions are omitted.

According to some example embodiments of the present invention, an LCD device is driven in a transflective mode with a mono-cell gap. Thus, the number of steps of a manufacturing process may be decreased and contrast ratio may be increased. Texture and alignment defects due to multi-cell gaps may be prevented. As a result, display quality may be improved and the yield of an LCD device may be increased. Thus, the present invention may be applied to an LCD device driven on transflective with a mono-cell gap.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method for driving a liquid crystal display (LCD) device, comprising:
   outputting data signals according to image signals;
   boosting the data signals according to a first boost signal up to a first pixel voltage that is applied to a transmissive electrode to control first light passing through a liquid crystal layer on the transmissive electrode; and
   boosting the data signals according to a second boost signal up to a second pixel voltage that is applied to a reflective electrode to control the retardation of second light to be substantially equal to the retardation of the first light, the second light being incident into the liquid crystal layer on the reflective electrode and reflected from the reflective electrode,
   wherein the first boost signal is applied to a first boost line overlapping the reflective electrode, and wherein the second boost signal is applied to a second boost line overlapping the reflective electrode.

2. The method of claim 1, wherein cell gaps of the liquid crystal layer on the transmissive electrode and the reflective electrode are substantially equal to each other.

3. The method of claim 2, wherein voltage levels of the first and second pixel voltages are controlled so that the retardation of the second light before and after the reflection from the reflective electrode is substantially equal to the retardation of the first light passing through the liquid crystal layer.

4. The method of claim 3, wherein voltage levels of the first and second pixel voltages are controlled so that a gray scale of the first light are substantially equal to a gray scale of the second light.

5. The method of claim 4, wherein the first and second boost signals are controlled so that transmittance of the liquid crystal layer on the transmissive electrode is substantially equal to transmittance of the liquid crystal layer on the reflective electrode.

6. The method of claim 5, wherein the cell gaps are in the range of from about 3.3 μm to 3.5 μm, the first pixel voltage is in the range of from about 2.0 V to 4.3 V and the second pixel voltage is in the range of from about 2.0 V to 3.1 V.

7. The method of claim 3, further comprising:
   linearly and circularly polarizing incident light into the transmissive electrode to provide the first light; and
   linearly polarizing the second light and the first light having passed through the liquid crystal layer.

8. The method of claim 7, wherein the incident light is linearly polarized by a first polarizing plate and a first ½λ plate, then the incident light is circularly polarized by the first ¼λ plate to form the first light, the first light and the second light passing through the liquid crystal layer are linearly polarized by a second ¼λ plate, a second ½λ plate and a second polarizing plate successively.

9. An LCD device comprising:
   an array substrate including a first and a second switching elements on a pixel area of a substrate, a gate line being electrically connected with gate electrodes of the first and the second switching elements, a data line being electrically connected with the source electrodes of the first and the second switching elements, a first boost line forming a first storage capacitor together with the drain electrode of the first switching element, a second boost line forming a second storage capacitor together with the drain electrode of the second switching element, a transmissive electrode being electrically connected with the drain electrode of the first switching element on a first area of the pixel area and a reflective electrode being electrically connected with the drain electrode of the second switching element on a second area of the pixel area;
   a counter substrate facing the array substrate; and
   a liquid crystal layer disposed between the counter substrate and the array substrate, cell gaps on the transmissive electrode and the reflective electrode being equal to each other,
   wherein the first boost line and the second boost line overlap the reflective electrode.

10. The LCD device of claim 9, wherein the first and the second boost lines are formed both sides of the gate line on the substrate and substantially parallel to the gate line, the gate line extending between the first and the second switching elements.

11. The LCD device of claim 10, wherein the first and the second boost lines, the gate line, the first and the second source electrodes and the second drain electrode are formed under the reflective electrode.

12. The LCD device of claim 11, wherein the array substrate comprising:
   a first storage electrode facing the drain electrode of the first switching element, the first storage electrode being formed of transmissive and conductive material and being electrically connected with the first boost line; and
   a second storage electrode facing the drain electrode of the second switching element, the second storage electrode being formed of transmissive and conductive material and being electrically connected with the second boost line.

13. The LCD device of claim 9, further comprising a driving part, the driving part providing data signals being applied to the data line according to external image signals, a first boost signal being applied to the first boost line, the data signals being boosted by the first boost signal up to a first pixel voltage being applied to the transmissive electrode, a second boost signal being applied to the second boost line, the data signals being boosted by the second boost signal up to a second pixel voltage being applied to the reflective electrode and control signals controlling the first and the second switching electrode so that the retardation of light being incident into the liquid crystal layer on the reflective electrode and being reflected from the reflective electrode and the retardation of light passing through the liquid crystal layer on the transmissive electrode are substantially equal to each other.

14. The LCD device of claim 13, further comprising
   a first ¼λ plate, a first ½λ plate and a first polarizing plate being successively disposed on a rear face of the array substrate; and
   a second ¼λ plate, a second ½λ plate and a second polarizing plate being successively disposed on an upper face of the counter substrate.

15. The LCD device of claim 14, wherein the driving part controls the first and the second boost signals so that a gray scale of light passing through the liquid crystal layer on the transmissive electrode and a gray scale of light of the liquid crystal layer on the reflective electrode are substantially equal to each other.

* * * * *